United States Patent
Heyl et al.

(10) Patent No.: US 9,656,535 B2
(45) Date of Patent: May 23, 2017

(54) METHOD FOR OPERATING AN AIR CONDITIONER FOR A MOTOR VEHICLE

(71) Applicant: VISTEON GLOBAL TECHNOLOGIES, INC., Van Buren Township, MI (US)

(72) Inventors: Peter Heyl, Cologne (DE); Dirk Schroeder, Manching (DE); Hans Hammer, Pfaffenhofen (DE); Jorg Bodewig, Kerpen (DE)

(73) Assignee: HANON SYSTEMS, Daejeon-si (KR)

( * ) Notice: Subject to any disclaimer, the term of this patent is extended or adjusted under 35 U.S.C. 154(b) by 636 days.

(21) Appl. No.: 14/029,433

(22) Filed: Sep. 17, 2013

(65) Prior Publication Data

US 2014/0075966 A1    Mar. 20, 2014

(30) Foreign Application Priority Data

Sep. 17, 2012  (DE) .................. 10 2012 108 729

(51) Int. Cl.

| F25D 3/12 | (2006.01) |
|---|---|
| F25B 13/00 | (2006.01) |
| G05D 23/30 | (2006.01) |
| F25B 27/00 | (2006.01) |
| B60H 1/32 | (2006.01) |
| B60H 1/00 | (2006.01) |

(52) U.S. Cl.
CPC ..... B60H 1/00878 (2013.01); B60H 1/00921 (2013.01); *B60H 2001/00949* (2013.01)

(58) Field of Classification Search
CPC .......... B60H 1/00878; B60H 1/00921; B60H 2001/00949

USPC ............ 165/202; 62/56, 238.7, 244
See application file for complete search history.

(56) References Cited

U.S. PATENT DOCUMENTS

| 5,899,086 A * | 5/1999 | Noda ................. B60H 1/00914 165/42 |
| 6,125,643 A * | 10/2000 | Noda ................. B60H 1/00914 165/202 |
| 6,237,357 B1 * | 5/2001 | Hirao .................... B60H 1/004 62/239 |

(Continued)

FOREIGN PATENT DOCUMENTS

| DE | 4244137 C2 | 7/1993 |
| DE | 102004038790 A1 | 2/2006 |

(Continued)

*Primary Examiner* — Henry Crenshaw
(74) *Attorney, Agent, or Firm* — Fraser Clemens Martin & Miller LLC; James D. Miller

(57) ABSTRACT

The invention relates to a method for operating an air conditioner (1) for treating the air of a passenger compartment of a motor vehicle. The air conditioner (1) exhibits a refrigerant circuit (2) configured for a combined cooling unit and heat-pump mode and for a post-heating mode. In the heat-pump mode with a first and a second heat source, two heat sources differing from each other can be used. A temperature of the first heat source, a temperature of the second heat source, and a regulation characteristic number and a maximum pressure are taken into account in the refrigerant circuit (2) for operating the air conditioner (1) in a heat-pump mode. The invention additionally relates to a method for switching between the two heat-pump modes.

7 Claims, 4 Drawing Sheets

(56) References Cited

U.S. PATENT DOCUMENTS

| | | | | |
|---|---|---|---|---|
| 7,380,588 B2* | 6/2008 | Helt | ............... | F24D 12/02 165/240 |
| 2003/0079873 A1* | 5/2003 | Kuroda | ............. | B60H 1/00735 165/202 |
| 2003/0164001 A1* | 9/2003 | Vouzelaud | ......... | B60H 1/00885 62/244 |
| 2005/0061497 A1* | 3/2005 | Amaral | ............. | B60H 1/00278 165/202 |
| 2005/0103487 A1* | 5/2005 | Aflekt | ............... | B60H 1/00907 165/202 |
| 2011/0296861 A1* | 12/2011 | Honda | ............... | F24D 3/08 62/238.7 |
| 2012/0085114 A1* | 4/2012 | Graaf | ................ | B60H 1/00278 62/238.7 |
| 2014/0075966 A1* | 3/2014 | Schmitz | ............ | B60H 1/00921 62/56 |

FOREIGN PATENT DOCUMENTS

| | | | |
|---|---|---|---|
| DE | 102010024853 A1 | 12/2010 | |
| DE | 102010024775 A1 | 12/2011 | |
| DE | 102010042127 A1 | 4/2012 | |
| EP | 0913282 B1 | 5/1999 | |
| JP | H0478613 A | 3/1992 | |
| JP | H05149643 A | 6/1993 | |
| JP | H09295506 A | 11/1997 | |
| JP | 2000238522 A | 9/2000 | |

* cited by examiner

METHOD FOR OPERATING AN AIR CONDITIONER FOR A MOTOR VEHICLE

CROSS-REFERENCE TO RELATED APPLICATION

This application claims the benefit of German non-provisional patent application serial no. DE 10 2012 108 729.6 filed Sep. 17, 2012, which is hereby incorporated herein by reference in its entirety.

FIELD OF THE INVENTION

The invention relates to a method for operating an air conditioner for processing the air in the passenger compartment of a motor vehicle. The air conditioner exhibits a refrigerant circuit for a combined cooling and heat-pump mode as well as for a post-heating mode. In the heat-pump mode, two heat sources different from each other are usable.

BACKGROUND OF THE INVENTION

In a vehicle known from prior art for heating the input air for the passenger compartment, waste heat from the engine is used. By means of the coolant converted in the engine cooling circuit, the waste heat is brought to the cooler of the air conditioner, and there transferred via the heating warmth exchanger to the air flowing into the passenger compartment.

Known facilities with coolant-air heat exchangers, which relate to the heating performance from the cooling circuit of an efficient internal combustion engine of the vehicle prime mover, no longer attain the temperature level required for comfortable heating of the passenger compartment when the ambient temperature is low, to cover the overall heating requirement of the passenger compartment. The same holds true for facilities in vehicles with hybrid propulsion.

When the overall heating requirement of the passenger compartment cannot be covered by the heat from the engine cooling circuit, heating measures such as electrical resistance heating (ERH) or fuel heaters are required. A more efficient option for heating of air for the passenger compartment is a heat pump with air as the heat source, in which the refrigerant circuit serves both as the sole heating means and also as a heating measure.

Prior-art air-air heat pumps, which are configured for the combined cooling-unit and heat-pump mode, and consequently also for the heating mode, admit the heat from ambient air.

Heat pump systems in which the output is transferred between the refrigerant and air often cannot simultaneously heat and dehumidify the air brought into the vehicle. The result of this is that the air conditioner of a vehicle cannot be operated with recirculated air at low ambient air temperatures. With recirculated-air operation, the air recirculates out of the passenger compartment. Due to the lack of a dehumidifying function, the remaining air humidity as well as the water emitted by the occupants in the form of vapor would lead to a misting up of the windows.

In traditional air conditioners, when the ambient temperature is above 20° C. and after thermal comfort has been reached, the air fed into the passenger compartment is cooled by about 3° C. to 10° C. and dehumidified in the process, and then heated up with a slight heating to the desired temperature of additional air. A target temperature for the passenger compartment of about 20° C. to 25° C. is, for example, intrinsic to thermal comfort.

Glycol-air heat pumps use the coolant of the internal combustion engine, which mostly corresponds to a water-glycol mixture, as the heat source. With this, heat is withdrawn from the coolant. As a consequence of this, the internal combustion engine is run for a longer time at low temperature, which has a negative effect on exhaust emissions and fuel consumption. Due to the internal combustion engine operating intermittently in hybrid vehicles, during longer trips the coolant temperature does not become sufficiently high. As a consequence, the internal combustion engine is subjected to a start-stop operation at low ambient temperature. The internal combustion engine is not shut off.

In DE 10 2010 024 775 A1, a device is described for air conditioning of vehicles, which is operable both in the heating and in the cooling mode. The device exhibits a refrigerant circuit, which comprises a thermal environment module with a condenser for heat exchange with the ambient air, a thermal passenger-compartment module with a vaporizer and a heat register for treatment of feed air for the passenger compartment, an expansion module with an expansion valve, and a compressor for compressing the refrigerant. In addition, the device is configured with a fluid heat exchanger which is linked with a connectable fluid circuit independent of the refrigerant circuit. The components can be switched with aid of valves so that the refrigerant can admit heat in the heating mode via the connectable fluid heat exchanger or the condenser of the ambient module, or via both, which in turn can be exchanged with the inserted condensation energy via the passenger compartment module to the passenger-compartment feed air.

EP 0 913 282 B1 discloses an air conditioner for a motor vehicle with a refrigerant circuit comprising a compressor and a first cooler, a first condenser, which is placed with a heating core of an engine cooling circuit in an air flow channel, a second condenser, and a second cooler, which are jointly arrayed in a second air flow channel. The second cooler and the second condenser are configured in fluid-connected fashion as well as switched parallel to the first condenser. The refrigerant circuit is configured for a combined cooling and heating operation. A third condenser is fluid-connected with the second condenser and has the coolant of an engine cooling circuit flowing through it. Additionally the air conditioner exhibits a control device which is configured for controlling the flow of the engine cooling medium and/or of the refrigerant, depending on the thermal loading state of the vehicle in correspondence with the discharge pressure of the compressor. When it goes below the limit value for the compressor discharge pressure, the compressor stops operating.

In DE 10 2010 024 853 A1, an air conditioner is disclosed with a refrigerant circuit, which comprises a condenser for taking a refrigerant in by suction, compressing it and ejecting it, an external heat exchanger for transferring heat between the refrigerant and the outside air, as well as two inner heat exchangers for transferring heat between the refrigerant and the air to be fed into the passenger compartment. In addition, the air conditioner exhibits refrigerant circuit switchover devices which are suited to switch the refrigerant circuit between the cooling mode and a heating mode. The refrigerant circuit switchover device is configured with several electromagnetic valves, which can be switched into a preset opened or closed state. Exterior air serves as the sole heat source.

The task of the present invention is to further develop the method for operating an air conditioner with a refrigerant circuit for the combined cooling-device and heat pump mode as well as a post-heating mode for heating, cooling and dehumidifying the air to be treated for the passenger compartment, especially of motor vehicles with an insufficient heat source from the prime mover. High-level operating safety is thereby ensured with minimum expense. The air conditioner should be able to be operated with high efficiency in the various operational modes.

SUMMARY OF THE INVENTION

The problem is solved by the features of the independent patent claims. Additional embodiments of the invention are indicated in the subordinate claims.

Especially the problem is solved by an invention-specific method for operating an air conditioner for treating the air of the passenger compartment of a motor vehicle. The air conditioner exhibits a refrigerant circuit configured for a combined cooling device and heat-pump mode as well as for a post-heating mode. In the heat-pump mode, two heat sources differing from each other can be used with a first and a second heat source.

According to the concept of the invention, the temperatures of the first and second heat sources, a regulation characteristic number, and the maximum pressure in the refrigerant circuit are determined, and are allowed for to determine the operation of the air conditioner in a heat-pump mode. By operation, what is meant to be understood is switching on of the air conditioner in a heat-pump mode or the conversion of the air conditioner to a heat-pump mode.

According to a further development of the invention, the temperatures of the first and second heat source and the regulation characteristic number are compared with preset limit values. Depending on whether the limit values are attained, exceeded or fallen short of, the air conditioner is operated in a heat-pump mode.

During operation of the air conditioner in a heat-pump mode, in addition the maximum pressure in the refrigerant circuit is determined and compared with another limit value. If the preset limit value is achieved or exceeded, the refrigerant circuit is no longer operated in a heat-pump mode, i.e., the performance of the compressor is reduced in stepped fashion, the operational mode is switched, or the refrigerant circuit is switched off.

For deciding to operate the air conditioner in a heat-pump mode, additionally in advantageous fashion the temperature of the air in the passenger compartment is allowed for, which likewise is compared with a fourth preset limit value.

According to one advantageous embodiment of the invention, the first limit value of the first heat source is in the range from 0° C. to 20° C., the second limit value of the second heat source in the range from 30° C. to 100° C., and the fifth limit value of maximum pressure in the refrigerant circuit in the range from 18 bar to 32 bar. The third limit value of the regulation characteristic number exhibits a value at which the desired air temperature in the passenger compartment is reached and it is no longer required to operate the air conditioner in a heat-pump mode to achieve the desired air temperature in the passenger compartment.

The preferred limit values of temperature of the first heat source are 2° C., of the second heat source 70° C., and of the passenger compartment air 20° C. The limit values of the regulation characteristic number preferably exhibit a value of 50 and that of the maximum pressure in the refrigerant circuit, a value of 28 bar.

In addition, the problem of the invention is solved by a method for switching between the two heat pump modes with differing heat sources.

At the start, the air conditioner is operated in the first heat-pump mode. According to the concept of the invention, the temperatures of the first and second heat source as well as the "Maximum heating power" are determined on the air conditioning control device and compared with the particular preset limit values. Depending on whether the limit values are reached, exceeded or fallen short of, the operation of the air conditioner is maintained in the first heat-pump mode, or switched over to the second heat-pump mode.

When operating the air conditioner in the second heat-pump mode, advantageously the regulation characteristic number and the value of the maximum pressure in the refrigerant circuit are determined and compared. Depending on whether the pertinent limit values are reached, exceeded or fallen short of, the operation of the air conditioner is switched back from the second to the first heat-pump mode, or operation is kept in the second heat-pump mode.

According to a further development of the invention, the first limit value of the first heat source is in the range from −10° C. to +5° C., the second limit value of the second heat source in the range from 40° C. to 70° C., the fifth limit value of maximum pressure in the refrigerant circuit is in the range from 2 bar to 16 bar, and the sixth limit value of the second heat source is in the range from 0° C. to 20° C. The third limit value of the regulation characteristic number exhibits a value which describes a temperature below the desired temperature in the passenger compartment.

The preferred set limit values of temperatures of the first heat source are −7.5° C. and of the second heat source 50° C. and 8° C. The preferred limit values of the regulation characteristic number exhibit the value 55 and that of the maximum pressure in the refrigerant circuit, a value of 26 bar. The determined limit values and the regulation characteristic number are variable relative to individual systems and control modes, can be determined in differing ways, and thus exhibit differing values.

The heat-pump modes of the air conditioners preferably use ambient air as the first heat source, and the coolant of an engine cooling circuit as the second heat source. When a cooler louver and internal locking and air guidance devices are present, if necessary also the air from the engine compartment, and thus the waste heat of the engine, can be used as the ambient air. It is also possible to include alternative heat sources such as exhaust gas, charge air, any electronic components present, and the battery or resistance heating in the engine cooling circuit.

According to one configuration of the invention, the refrigerant circuit exhibits a compressor, a first heat exchanger for transferring heat between the refrigerant and the environment with an expansion valve, and a second heat exchanger for feeding heat from the coolant of the engine cooling circuit to the refrigerant with an expansion valve placed upstream. The first heat exchanger is also designated as an ambient air-refrigerant heat exchanger, and the second heat exchanger as a coolant-refrigerant heat exchanger. In addition, the engine cooling circuit is configured with a third heat exchanger for providing heat from the coolant to the air to be treated for the passenger compartment with a shutoff valve placed upstream, which is also designated as a heater warmth transfer device. The second heat exchanger of the refrigerant circuit included in the engine cooling circuit exhibits a shutoff valve placed upstream.

The method for switching from the first to the second heat-pump mode preferably comprises the following steps:
 the coolant-refrigerant heat exchanger has coolant flowing through it for preheating the heat exchanger;

closing of the shutoff valve of the coolant-refrigerant heat exchanger when the shutoff valve of the heating warmth heat exchanger is opened in the engine cooling circuit, so that the coolant flows only through the heating warmth transfer device and thus the air fed into the passenger compartment is prevented from being lowered in temperature;

closing of the expansion valve of the ambient air-refrigerant heat exchanger when the expansion valve of the coolant-refrigerant heat exchanger is closed, for removal by suction of the refrigerant from the ambient air-refrigerant heat exchanger; and terminating the suction process as well as opening the expansion valve and the shutoff valve of the coolant-refrigerant heat exchanger in the engine cooling circuit, so that the coolant flows through the coolant-refrigerant heat exchanger.

According to a further development of the invention, the suction process is monitored through determination of the pressure sites in the ambient air-refrigerant heat exchanger and at the entry into the compressor, as well as terminated by opening of the expansion valve and of the shutoff valve of the coolant-refrigerant heat exchanger in the engine cooling circuit, if preset values of the pressures are reached.

Alternatively, the suction process is terminated following expiration of a period of time by opening the expansion valve and the shutoff valve of the coolant-refrigerant heat exchanger in the engine cooling circuit. Preferably the time duration is in a range from 1 to 60 seconds, preferably of about 10 seconds.

According to a first alternative embodiment, the shutoff valve of the heating warmth exchanger is opened in the engine cooling circuit with opening of the expansion valve and of the shutoff valve of the coolant-refrigerant heat exchanger in the engine cooling circuit, so that the refrigerant flows through the coolant-refrigerant heat exchanger and the heating warmth exchanger.

According to a second alternative embodiment, the locking valve of the heating warmth exchanger in the engine cooling circuit is closed before opening of the expansion valve of the ambient air-refrigerant heat exchanger.

The method for switching from the second to the first heat pump mode preferably comprises the following steps:
  opening the expansion valve of the ambient air-refrigerant heat exchanger when the expansion valve of the coolant-refrigerant heat exchanger is opened;
  keeping the expansion valves open for a period from 5 to 60 seconds;
  having a coolant flow through the heating warmth exchanger and the coolant-refrigerant heat exchanger with opened shutoff valves in the engine cooling circuit; and
  simultaneous closing of the expansion valve and shutoff valve of the coolant-refrigerant heat exchanger in the engine cooling circuit with the shutoff valve of the heating warmth exchanger in the engine cooling circuit opened, so that the coolant flows solely through the heating warmth exchanger.

According to an alternative embodiment, the method for switching from the second to the first heat pump mode preferably comprises the following steps:
  opening of the expansion valve of the ambient air-refrigerant heat exchanger;
  closing of the expansion valve of the coolant-refrigerant heat exchanger; and
  closing of the shutoff valve of the coolant-refrigerant heat exchanger with an opened shutoff valve of the heating warmth transfer device in the engine cooling circuit, so that the coolant flows only through the heating warmth exchanger, wherein the steps advantageously are carried out simultaneously or the expansion valve of the coolant-refrigerant heat exchanger is closed with a time lag to the opening of the expansion valve of the ambient air-refrigerant heat exchanger, to condense the refrigerant remaining in the coolant-refrigerant heat exchanger, and then the shutoff valve of the coolant-refrigerant heat exchanger is closed.

The method for switching over from the heat-pump mode to into a mode with no auxiliary heating measures preferably includes the following steps:
  graduated reduction of the power of the compressor; or
  switching from the second to the first heat pump mode; or
  when operating in the second heat-pump mode, switching of the engine cooling circuit, wherein:
  the shutoff valve of the coolant-refrigerant heat exchanger in the engine cooling circuit is closed and the shutoff valve of the heating warmth exchanger is opened, so that the coolant flows only through the heating warmth exchanger, to heat the coolant in the engine cooling circuit, wherein only in the heating warmth exchanger is heat removed from the engine cooling circuit; and
  the coolant-refrigerant heat exchanger has refrigerant flowing through it, with an opened expansion valve placed upstream; or
  graduated reduction in the power of the compressor, during operation in the second heat-pump mode, switching over of the engine cooling circuit, wherein the shutoff valve of the coolant-refrigerant heat exchanger is closed and the shutoff valve of the heating warmth exchanger is opened, so that the coolant flows only through the heating-warmth exchanger, and the coolant-refrigerant heat exchanger has refrigerant flowing through it, with the preset expansion valve placed upstream opened, and switching over from the second to the first heat-pump mode.

With operation in the second heat-pump mode, the power of the compressor is reduced to shut off operation in the first heat-pump mode over a duration from 10 to 240 seconds, and thus advantageously to avoid a sudden drop in the temperature of the air being fed to the passenger compartment.

The method for switching over from the first heat-pump mode to the defrosting mode of the first heat exchanger preferably comprises the following steps:
  determining the temperature of the coolant and of the ambient air;
  determination of the traveling status;
  determination of the regulation characteristic number (RCN);
  determination of the state of the ambient air-refrigerant-heat exchanger using the pressure and temperature at the outlet of the compressor, along with suction pressure; and
  starting the defrosting mode.

According to a further development of the invention, the refrigerant circuit exhibits a valve arrangement after the compressor in the flow direction of the refrigerant, comprising a branch, a valve placed between the branch and the ambient air-refrigerant heat exchanger, and a valve placed between the branch and a heat exchanger for transferring heat from the refrigerant to the air to be fed to the passenger compartment. Additionally, the refrigerant circuit comprises a secondary flow path, which extends from the connection between the valve pertaining to the valve arrangement and the ambient air-refrigerant heat exchanger up to the entrance into the compressor. In addition, the refrigerant circuit exhibits a valve of a valve arrangement with a branch as well as the expansion valves pertaining to the ambient air-refrigerant heat-transfer device and the coolant-refrigerant heat exchanger, wherein each of the three valves is assigned to a flow path of the branch.

The method for switching from the first heat-pump mode to the defrosting mode of the first heat exchanger comprises the following steps according to a first alternative:
  switching off the compressor;
  opening the valve placed between the branch and the ambient air-refrigerant heat exchanger with the expansion valve opened of the ambient air-refrigerant heat exchanger;
  closing of the valve placed between the branch and the heat exchanger for exchange of heat from the refrigerant to the air to be fed to the passenger compartment, of the valve placed in the secondary flow path, and of the valve provided in the valve arrangement with the expansion valves;
  opening of the expansion valve of the coolant-refrigerant heat exchanger;
  switching on of the fan of the low-power ambient air-refrigerant heat exchanger;
  switching on the compressor;
  redirection of the feed air of the engine compartment by closing of the louvers of a controllable cooling air inlet;
  increasing the power of the fan of the ambient air-refrigerant heat exchanger to a maximum value, to defrost and dry the ambient air-refrigerant heat exchanger, whereby during the drying, condensate is removed from the surface of the ambient air-refrigerant heat exchanger, to delay new ice from forming;
  switching off the compressor; and
  switching the valves for operation in the first heat-pump mode.

The power of the fan of the ambient air-refrigerant heat exchanger is preferably increased to the maximum value over a period in the range from 10 seconds to 240 seconds.

The method for switching from the first heat-pump mode to the defrosting mode of the ambient air-refrigerant heat exchanger for defrosting the ambient air-refrigerant heat exchanger exhibits the following step according to a second alternative:
  opening of the valve placed between the branch placed after the compressor in the flow direction and the ambient air-refrigerant heat exchanger, wherein warm refrigerant simultaneously flows through a heat exchanger and the ambient air-refrigerant heat exchanger for feeding of air from the refrigerant to the air to be treated for the passenger compartment.

The condenser as a heat exchanger for dehumidifying and/or cooling of the air to be fed to the passenger compartment is switched on, and refrigerant flows through it.

According to one advantageous embodiment of the invention, the regulation characteristic number (RCN) is determined from the deviation of a target state from a de facto state of the air to be fed to the passenger compartment. The target temperature of the air to be fed to the passenger compartment is dependent on the desired temperature of the air in the passenger compartment, the current temperature in the passenger compartment, the temperature of the ambient air, and the temperature of the second heat source.

The method for directing air of an air conditioner with an air outlet directed toward a windshield, an air outlet directed toward the occupants, and an air outlet directed toward a foot well during operating in the heat pump mode comprises the following steps:
  determination of the values of a rain and/or moisture and/or temperature and/or mist sensor in the windshield;
  closing of the air outlet directed toward the windshield in case the windshield is not misted up; or
  partial opening of the air outlet directed toward the windshield and simultaneous opening of the air outlets directed toward the occupants and toward the foot well.

Also, for deciding on operating the air conditioner in the first heat-pump mode, preferably the values of the moisture sensor, the rain sensor, and a fog sensor are taken into account.

To detect increased risk of ice forming on the ambient air-refrigerant heat exchanger and to not operate the air conditioner in the first heat-pump mode, or to do so only briefly, in addition, the values of a solar sensor and of an exhaust sensor are accounted for.

Additionally, advantageously the data from vehicles in motion in front, as well as of traffic lights, are included in decisions on turning on the air conditioner or on switching between the operational modes, like switching to the defrosting mode of the ambient air-refrigerant heat exchanger.

Additional advantages of the refrigerant circuit of the air conditioner vis-à-vis the prior art can be summarized as follows:
  quick provision of warm air when the ambient temperature is low, and cold cooling water of the engine cooling circuit;
  simple, safe operation, optimized in energy terms, especially in a heat pump mode with air as the heat source, also during system startup, as regards the power to be provided, efficiency and comfort;
  maximum service life of the air conditioner, especially by minimizing switching operations;
  minimal effects of the switching processes between the heat pump modes on temperatures at which air is blown out from the passenger compartment;
  efficiently obtaining comfort through switching back to the heat-pump mode with air as the heat source, if the temperature of the coolant is too low;
  re-shifting of refrigerant from a component that is in operation to one that has been switched to no longer active in the refrigerant circuit after a change in the operational mode;
  procedures for switching on, off and between the heat-pump mode depend on:
  the temperature of the engine cooling water, the environment, and the passenger compartment;
  compressor characteristic values like maximum pressure, maximum end temperature and corresponding control values;
  settings on the AC operating part in combination with the air conditioning of the passenger compartment, especially settings on the fan, the recirculating air and the air distribution;
  engine r.p.m., sensors of solar, rain, and mist states, communication signals between vehicles and traffic signals, the amount of time the vehicle does not move, and thermo-management values which the vehicle computes internally.

BRIEF DESCRIPTION OF THE DRAWINGS

Additional particulars, features and advantages of the invention are gleaned from the following specification of embodiment examples with reference to the pertinent drawings. Shown are.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
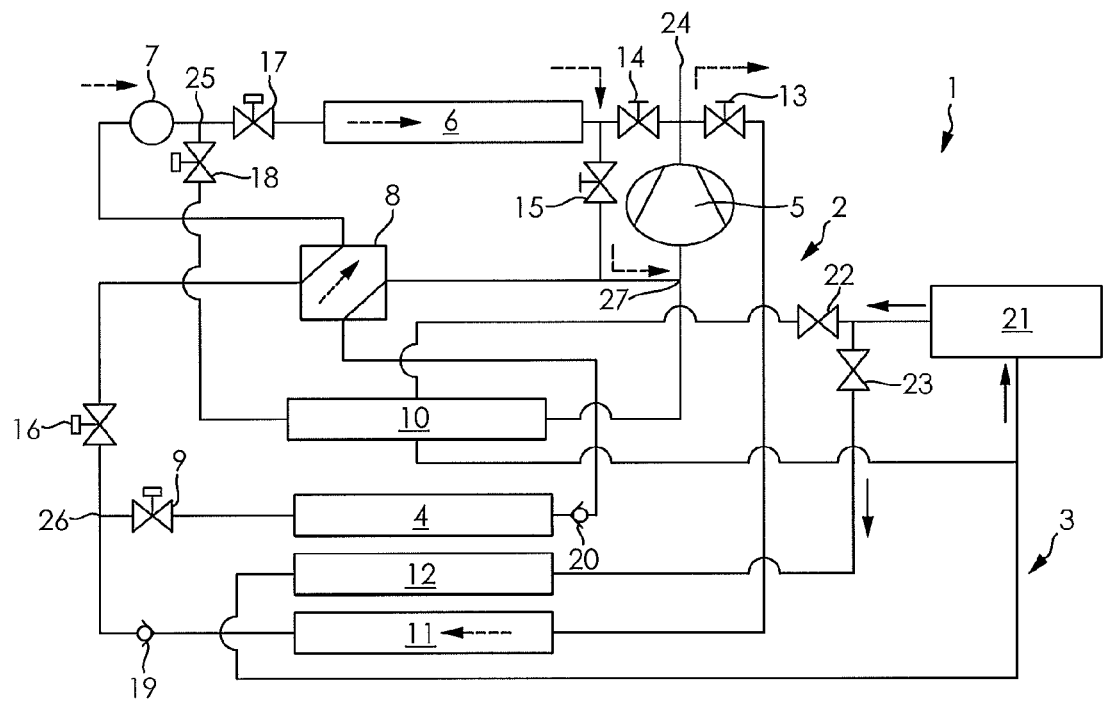
FIG. 1: the air conditioner with the refrigerant circuit in the heat-pump mode with ambient air as the heat source.
Figure 2:
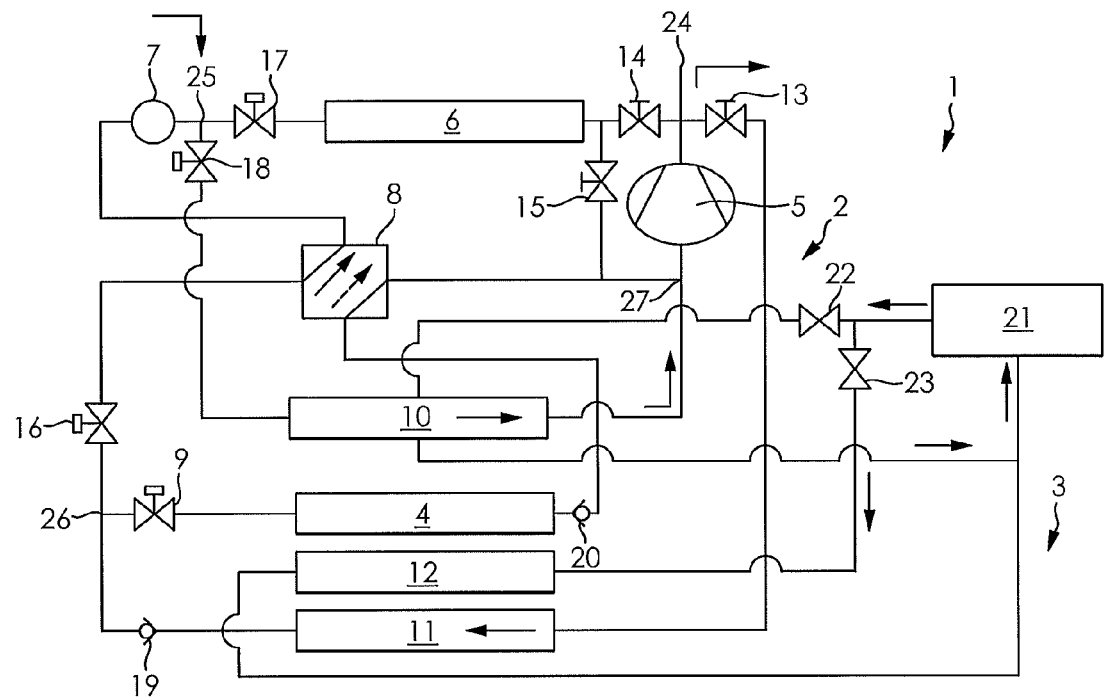
FIG. 2: the air conditioner with the refrigerant circuit in the heat-pump mode with coolant of the engine cooling circuit as the heat source.

In FIGS. 1 and 2, the air conditioner 1 for a motor vehicle with the refrigerant circuit 2 and the engine cooling circuit 3 is depicted in various operational modes. FIG. 1 shows the refrigerant circuit 2 in the heat-pump mode with ambient air as the heat source, i.e., in operation as an air heat pump. FIG. 2 shows the refrigerant circuit 2 in the heat-pump mode with coolant of the engine cooling circuit 3 as the heat source, i.e., in operation as a coolant or water-glycol heat pump.

Along with a condenser 4, a compressor 5, a heat exchanger 6 operated as a condenser and gas cooler for heat exchange between the refrigerant and the environment with flow passing through in the flow direction of the refrigerant, the primary refrigerant circuit 2 comprises a plenum 7 and a valve 16 as well as an inner heat exchanger 8. By inner heat exchanger 8, what is meant is an internal circuit heat exchanger, which serves to exchange heat between the refrigerant at high pressure and the coolant at low pressure. For example, the liquid coolant is further cooled after condensation, and also the suction gas is superheated before the compressor 5. A check valve 19 prevents the refrigerant from flowing in the direction of the valve 16 into a heat exchanger 11. In the opposite flow direction, the check valve 19 allows flow to pass.

If the refrigerant liquefies in subcritical operation, as for example with R134A refrigerant, or under certain environmental conditions with carbon dioxide, the heat exchanger 6 is designated as a condenser. One part of the heat exchange takes place at a constant temperature. In supercritical operation, or with supercritical heat transfer in the heat exchanger 6, the temperature of the refrigerant slowly drops. In this case, the heat exchanger 6 is also designated as a gas cooler. Supercritical operation can, under certain environmental conditions or operational modes of the air conditioner 1, appear for example when the refrigerant is carbon dioxide.

For heating of the feed air for the passenger compartment or for operating in heat-pump mode, the refrigerant circuit 2 of air conditioner 1 exhibits secondary flow paths with additional components.

At the outlet of the compressor 5, a branch 24 is configured. Between the branch 24 and the heat exchanger 6, an additional shutoff valve 14 is situated. A first secondary flow path extends from the branch 24 to branch 26 at the outlet of the expansion valve 16, and extending in the flow direction of the refrigerant from compressor 5, exhibits a shutoff valve 13 and the heat exchanger 11, which is also designated as a heat register 11 and fulfils the function of a second condenser or gas cooler. The heat exchanger 11 serves for heat exchange from the refrigerant to the air to be transmitted to the passenger compartment. The branch 24 placed after the compressor 5 in the flow direction of the refrigerant, as well as shutoff valves 13, 14, are also designated as a valve arrangement.

At the entry, the condenser 4 exhibits an additional valve 9 configured as an expansion valve, and at the exit a check valve 20. The first secondary flow path empties out between the expansion valve 16 and the valve 9 in the primary refrigerant circuit.

The valve 9 and the check valve 20 close the condenser 4 on both sides, thus preventing the flow of the refrigerant through the condenser 4 in the heat-pump mode. The check valve 20 prevents refrigerant from being stored in the condenser 4 in the heat pump mode.

Alternatively, valve 9 can also be configured as a shutoff valve. However, no combined operation with cooling and/or de-moisturizing as well as subsequent heating of the air to be fed to the passenger compartment is possible, because with the configuration of valve 9, the refrigerant cannot be depressurized in the condenser 4 to a pressure level for condensation.

A second secondary flow path extends from a branch 25 which is placed between the heat exchanger 6 and the plenum 7, up to the emptying point 27 at the entrance into the compressor 5. The second secondary flow path consequently empties out between the inner heat exchanger 8 and the compressor 5 into the primary refrigerant circuit and exhibits an expansion valve 18 and a heat exchanger 10. The heat exchanger 10 has coolant from the engine cooling circuit 3 flowing through it on one side and refrigerant from the other side. On the refrigerant side, the heat exchanger 10 is operated as a condenser, so that depending on the operating mode, heat from the coolant is passed to the refrigerant. The heat exchanger 10 for feeding of heat from the coolant of engine cooling circuit 3 to the refrigerant is also designated as a chiller.

A third secondary flow path extends from the connection between the valve 14 pertaining to the valve arrangement and the heat exchanger 6 up to the entry into compressor 5.

Within the engine cooling circuit 3, the coolant, preferably a water-glycol mixture, is circulated between an engine or motor 21 and the heat exchangers 10, 12. The heat released from the engine 21 is transported to heat exchangers 10, 12, switched parallel in flow terms, which are also to be viewed as glycol coolers.

In heat exchanger 10, the heat is transferred to the evaporating refrigerant in refrigerant circuit 2. Thus, heat exchanger 10 is configured as a glycol-refrigerant heat exchanger. In heat exchanger 12, the heat is transferred to the air to be fed to the passenger compartment, so that it can also be designated as a heating warmth exchanger 12. Heat exchanger 12 is configured as a glycol-air heat exchanger. The parallel-switched flow paths of the engine cooling circuit 3 are opened or closed by means of shutoff valves 22, 23, with each flow path formed with a shutoff valve 22, 23, and thus being able to be switched separately.

Preferably the shutoff valves 22, 23 can be configured to be clock-pulsed or regulated, to be able to vary the volume flow of the coolant as needed and thus to adjust the optimal flow to the particular heat exchangers 10, 12.

The air brought in by suction via a fan (not depicted) is guided in the flow direction first via the condenser 4, then the heating warmth exchanger 12, and then the heat register 11, before it flows into the passenger compartment. The heat exchangers 4, 12, 11 are consequently situated in the sequence indicated relative to the air to be fed to the passenger compartment, and are switched on and off depending on the requirement and operating mode. Alternatively, the heat register 11 can also be placed before the heating warmth exchanger 12 in the air flow direction.

At low ambient temperatures, the passenger compartment is to be heated, which can be implemented by means of the air conditioner 1 run in the heating or heat-pump mode.

In the heat-pump mode of air conditioner 1, the valves 9, 13, 14 are switched so that the refrigerant mass flow is guided through the first secondary flow path and thus through the heat register 11 configured as a second condenser-gas cooler. The direction in which the refrigerant flows is indicated by arrows, with the arrows of dashed lines showing the refrigerant flow direction in the heat-pump mode with air as the heat source as per FIG. 1, and the arrows of continuous lines showing the refrigerant flow direction in the heat-pump mode with the coolant of the engine cooling circuit 3 as the heat source as per FIG. 2.

The shutoff valve 13 is opened, while shutoff valve 14 is closed. In heat register 11, heat is emitted from the refrigerant to the air to be conducted to the passenger compartment.

The valve 9 is closed to segregate the condenser 4 in flow terms from the refrigerant circuit 2. Since the inner heat exchanger 8 only has flow passing on one side from it, no heat is exchanged. The inner heat exchanger 8 is inactive.

In the heat-pump mode with air as the heat source, the refrigerant is lowered to a pressure level and pertinent temperature level lying below the ambient temperature in the two-phase range as it flows through expansion valve 17. Then, in the heat exchanger 6 operated as a vaporizer, heat from the ambient environment is transferred to the refrigerant. The air conditioner 1 draws the heat from ambient air.

The refrigerant mass flow, after emerging from heat exchanger 6, is guided through the third secondary flow path and the opened shutoff valve 15 to the entry of compressor 5. Thus the refrigerant circuit 2 is closed.

In the engine cooling circuit 3, the coolant is circulated as needed between the engine 21 and the heating warmth exchanger 12. The shutoff valve 22 is closed, while shutoff valve 23 is opened. Thus, the coolant flows exclusively through the heating warmth exchanger 12, so that the heat extracted at the engine 21 is transferred exclusively to the air to be passed to the passenger compartment.

The heat exchanger 10 does not have flow passing therethrough of either of the refrigerant or the coolant. The valve 18 is closed.

In the heat-pump mode with the coolant of engine cooling circuit 3 as the heat source, the refrigerant, as it passes through expansion valve 18, is reduced to a pressure level corresponding to the coolant temperature, or under it, into the two-phase range. Then, in the condenser 10, heat from the coolant circulating in the engine cooling circuit 3 is transferred to the refrigerant. The air conditioner 1 takes heat from the engine cooling circuit 3. The refrigerant mass flow is taken in by suction from the compressor 5 after emerging from the condenser 10. The refrigerant circuit 2 is closed.

In the engine cooling circuit 3, the coolant is circulated between the engine 21 and the condenser 10. The shutoff valve 22 is opened. When shutoff valve 23 is simultaneously closed, the coolant flows exclusively through the condenser 10, so that the heat extracted at the engine 21 is exclusively passed to the refrigerant in the refrigerant circuit 2. The heating warmth exchanger 12 has no coolant flowing through it in the process.

Alternatively, along with shutoff valve 22, shutoff valve 23 can also be opened. Then the coolant flows in parallel through both the condenser 10 and the heating warmth exchanger 12, so that the heat extracted at the engine 21 is transferred both to the refrigerant and to the air to be passed to the passenger compartment.

Depending on the heat-pump mode with varying heat sources, the valves 17, 18 are alternately closed or opened, so that either heat exchanger 6 or heat exchanger 10 have refrigerant flowing through them, while the other heat exchanger 6, 10 is not impinged upon. Alternatively, both heat exchangers 6, 10 can have refrigerant flowing through them, so that both the ambient air and the coolant of the engine cooling circuit 3 are usable as heat sources.

The valves 16, 17, 18 and the branch 25 are to be viewed in combination as a valve arrangement, wherein each of the valves 16, 17, 18 is assigned to a flow path of the branch 25.

According to an alternative configuration, the valves 17, 18 of heat exchangers 6, 10, which are able to be operated as expansion valves, can be replaced by valve 16, likewise able to be operated as an expansion valve, wherein valve 16 replaces either valve 17 or valve 18.

In the embodiment form depicted, the valves 13, 14 are configured as 2-2-way valves. Consequently, valves 13, 14 exhibit two connections and two control positions. Alternatively, the valves 13, 14 are configured as a 3-2-way valve or with additional inclusion of valve 15, as a 4-2-way valve with the same valve characteristics as valves 13, 14, 15.

With the controls of air conditioner 1 as per FIGS. 1 and 2, in the various operating modes, the air mass flow to be fed to the passenger compartment can be heated both when flowing over the heat exchanger surface of heating warmth exchanger 12 of cooling circuit 3, and when flowing over the heat exchanger surface of heat register 11 of refrigerant circuit 2.

According to FIGS. 1 and 2, the air conditioner is run in a heat-pump mode with ambient air as the heat source and/or with coolant of the engine cooling circuit 3 as the heat source. Operation in the heat-pump mode with the two heat sources of ambient air and coolant, with other heat sources like exhaust gases, solar heat, or exhaust heat from electronic components also able to be used, is especially optimally adjusted for vehicles with internal combustion engines.

In the heat-pump mode with ambient air as the heat source, the windshield, for example, is not ventilated when it is not subjected to misting or icing. In addition, the windshield is made of a material that resists heat losses and/or has a heating function. The heating function of the windshield is comparable to the configuration of a heated rear window. For efficient operation of the air conditioner, allowance is made for the following:

ambient-environment signals, for example the sensors in the vehicle, or road traffic messages such as traffic signals;

data relevant to performance and safety such as misting of the windshield or the superheating controls of the compressor 5, or de-icing of the heat exchanger 6 operated as a condenser;

aspects relevant to comfort such as avoidance of perceptible changes in the climate of the passenger compartment, heat pump modes going out of operation or switching, and regulation of them, pre-heating of the condenser 10 for switching from the heat-pump mode with air as a heat source to the heat-pump mode with coolant as the heat source; and aspects relevant to cost.

The heat-pump mode, especially the mode with ambient air as the heat source, is operated in dependence on data of the rain sensor, the moisture sensor, the sun sensor, the passenger-compartment temperature, traffic signals, shares of recirculated air and fresh air in the flow channel of feed air for the passenger compartment, a computed comfort characteristic number or the expression of the comfort requirements of the occupants, which result from the settings on the air conditioner control device, the outer temperature and the coolant temperature. The computed comfort characteristic number is also designated as the regulation characteristic number.

Figure 3:
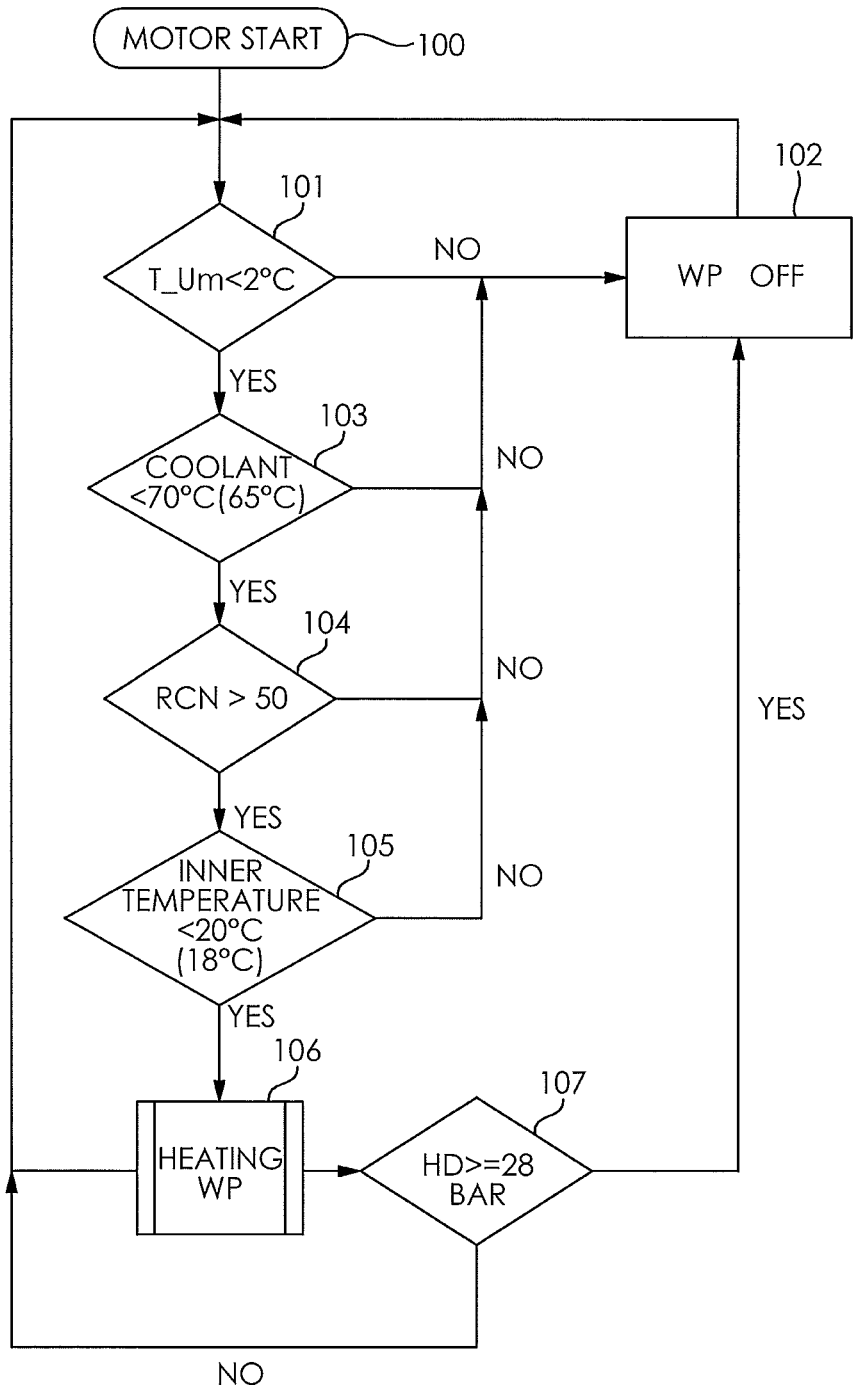
FIG. 3: procedural steps for switching the air conditioner on and off in the heat-pump mode as an auxiliary heating measure.

FIG. 3 shows the procedural steps for switching the air conditioner 1 on and off in the heat-pump mode as an auxiliary heating measure. After the engine is started in step 100, in step 101 there is a query of whether the ambient temperature T_Um is lower than 2° C. If the ambient temperature T_Um is greater than or equal to 2° C., the heat-pump mode of air conditioner 1 remains off as per step 102.

However, if the condition from step 101 has been met, in step 103 a determination is made of whether the temperature of the coolant of engine cooling circuit 3 is less than 70° C. If the temperature of the coolant is greater than or equal to 70° C., the heat-pump mode of air conditioner 1 as per step 102 remains off. If the temperature of the coolant of engine coolant circuit 3 is less than 70° C. and thus, the condition from step 103 is met, in step 104 a comparison is made of whether the regulation characteristic number RCN is greater than 50. If the regulation characteristic number RCN is smaller than or equal to 50, the heat-pump mode of air conditioner 1 as per step 102 stays off.

If the regulation characteristic number RCN is greater than 50 and the condition from step 104 is met, in step 105 a query is made of whether the interior temperature of the passenger compartment is lower than 20° C. If the inner temperature of the passenger compartment is higher than or equal to 20° C., the heat-pump mode of air conditioner 1 as per step 102 stays off. If the condition from step 104 is met, however, the air conditioner 1 is operated in the heat-pump mode as per step 106. It remains in operation until all the conditions of steps 101 to 105 have been met and the maximum pressure in the refrigerant circuit 2 as per step 107 is lower than 28 bar.

If a heating measure is required, the air conditioner 1 is operated in the heat pump mode as per step 106 from FIG. 3. Air conditioner 1 starts up in the heat-pump mode as per FIG. 4, preferably with air as the heat source. Subsequently, the heat pump mode can be switched over to the mode with coolant as the heat source. The switchover depends on the temperature at which air blows out of heat register 11 or the temperature of the coolant after flowing through the engine 21. During operation of air conditioner 1 in the heat-pump mode with air as the heat source, advantageously no incursion is made into the engine cooling circuit 3 and the heating of the engine 21 is not affected. In a short time, the engine 21 can reach its optimal operating temperature.

Along with the air conditioner 1 starting up in the heat-pump mode with air as the heat source, there also exists a possibility, however, especially with the Auto-HI setting, i.e., heating at maximum power, to start up the air conditioner 1 in the heat-pump mode with coolant as the heat source. According to a first method, the heating warmth exchanger 12 and the condenser 10 have coolant flowing through them simultaneously. According to an alternative second method, at the start only the condenser 10 has coolant flowing through it, to avoid a major cooling off of the coolant during the starting process of the engine 21. At a later point, the heating warmth exchanger 12 and the damper 10 can be switched over to parallel operation.

Figure 4:
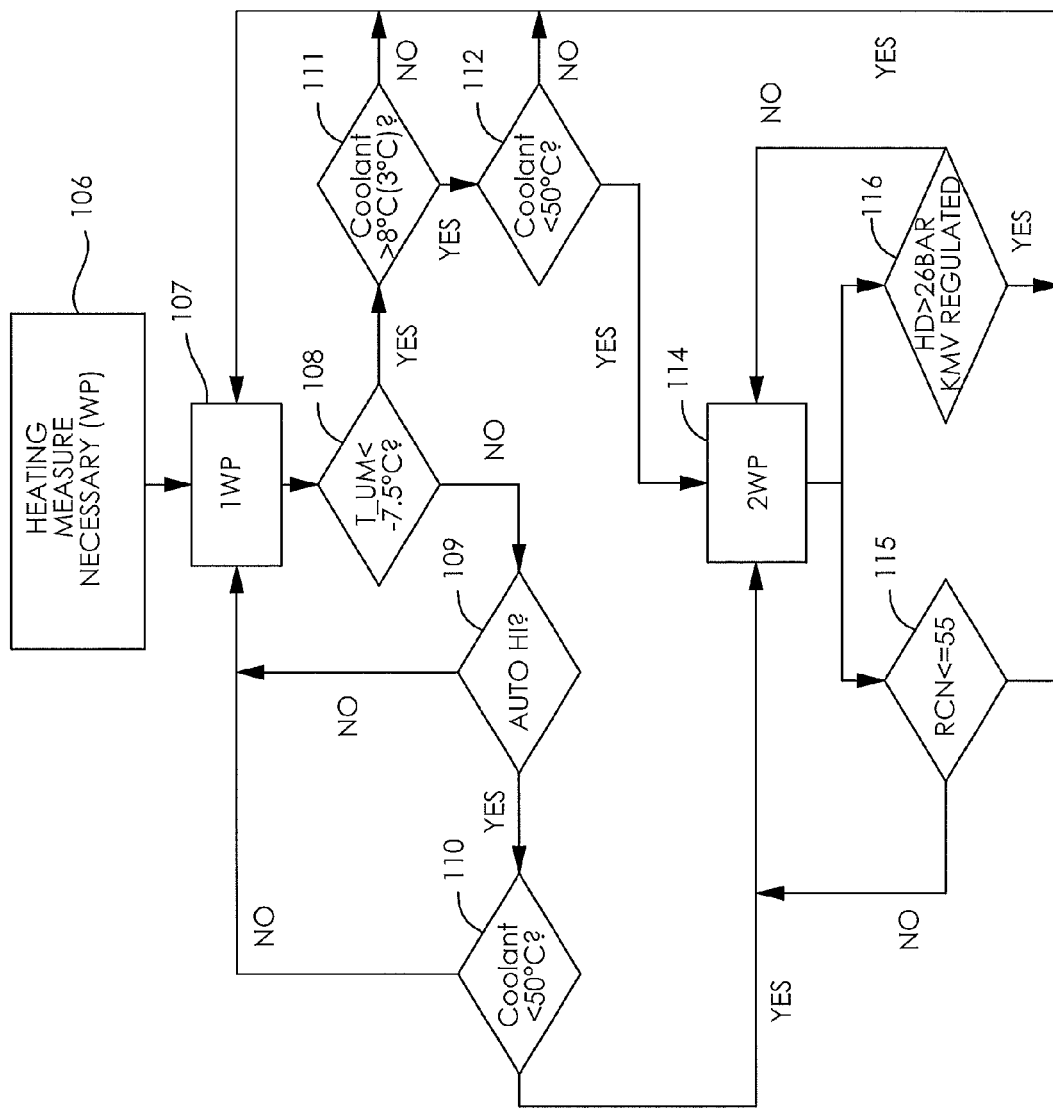
FIG. 4: procedural steps for switching the air conditioner between the heat-pump modes with air or coolant of the engine cooling circuit as the heat source.

In FIG. 4 is shown the operation of the air conditioner 1 as per FIGS. 1 and 2 in the heat-pump modes with switching from the mode with air as the heat source to the mode with coolant as the heat source, depending on the ambient temperature, the coolant temperature, or the Auto-HI setting on the air conditioner operating part, i.e., feeding according to maximum heating power. The switchover of the modes preferably happens at a limit temperature of the ambient air of −7.5° C., if the coolant simultaneously exhibits a temperature of over 8° C.

If the auxiliary heating measure as per step 106 is required, the air conditioner 1 is run in the heat-pump mode with air as the heating source as per step 107. If the ambient temperature as per step 108 is greater than or equal to −7.5° C., and the Auto-HI setting is not activated as per step 109, the air conditioner 1 is run in the heat-pump mode with air as the heat source. If according to step 109, the Auto-HI setting should be activated, in step 110 a check is made of what the temperature is of the coolant. If the coolant exhibits a temperature of 50° C. or above, the air conditioner 1 remains in the heat-pump mode with air as the heat source. However, if the coolant temperature should be below 50° C., the heat pump is switched over into operation with coolant as the heat source as per step 114.

If the ambient temperature as per step 108 is lower than −7.5° C., in steps 111, 112 the temperature of the coolant is checked. If the coolant should exhibit a temperature lower than or equal to 8° C. or higher than 50° C., the air conditioner 1 remains in the heat-pump mode with air as the heat source. With a temperature of greater than 8° C. and less than 50° C., the mode is switched to operation with coolant as the heat source as per step 114.

Operation in the heat-pump mode with coolant as the heat source continues as long as the maximum pressure in the refrigerant circuit 2 as per step 116 is smaller than or equal to 26 bar, and the regulation characteristic number RCN as per step 115 is greater than 55. Otherwise, the air conditioner 1 is again switched back into the heat-pump mode with air as the heat source. It is to be avoided that the air conditioner 1 switches out of the heat-pump mode with coolant as the heat source without previously being switched over into the heat-pump mode with air as the heat source, since otherwise the air to be fed to the passenger compartment will undergo a considerable cooling. Thus, sufficient comfort would not be ensured.

Before the switchover procedure from the heat-pump mode with air as the heat source to the heat-pump mode with coolant as the heat source, the condenser 10 is pre-heated with warm coolant. During the switchover process, only the heating warmth exchanger 12 has coolant flowing through it, while no coolant flows through the condenser 10, to minimize impairments of comfort in the passenger compartment.

The switchover starts with a shutting of expansion valve 17 in the flow direction before heat exchanger 6, while expansion valve 18 before heat exchanger 10 is still closed. Thus, coolant is drawn out by suction from heat exchanger 10.

The particular pressure situation in heat exchanger 6 or on the low-pressure side at the entrance into compressor 5 is preferably to be monitored, to actually implement a drawing out by suction. The reduced pressure should be less than the pressure in heat exchanger 10, which, based on the ambient temperature, would be set as the static pressure. Additionally, care is to be taken to timely termination of the suction process, so that if a check valve is not used, further re-displacement of the refrigerant is not forced, thus attaining a negative backflow effect. Appropriate precision in measurement of pressure and temperature is a prerequisite. Thus the check valve serves as an automatic safeguard against undesired re-displacement with a pressure situation that is altering on the low-pressure side.

After a preferred period of 10 seconds, the expansion valve 18 is simultaneously opened with the shutoff valve 22 of the engine cooling circuit 3, so that both the heating warmth exchanger 12 and the condenser 10 have coolant flowing through them. The refrigerant circuit 2 is now operated in the heat-pump mode with coolant as the heat source.

Alternatively, the shutoff valve 23 in the coolant line to the heating warmth exchanger 12 can be closed during opening of expansion valve 18, and remain closed for 2 minutes for example, so the coolant experiences less cooling. The heating warmth exchanger 12 is again joined in after a period of 2 minutes and coolant flows through it.

Operation of the air conditioner 1 is switched over from the heat pump mode with coolant as the heat source into the heat-pump mode with air as the heat source as per FIG. 4, when the maximum pressure in refrigerant circuit 2 as per step 116 rises above 26 bar, the Auto-HI setting as per step 109 is terminated or the regulation characteristic number as per step 115 is lowered to a value of 55, or the target temperature for blowout of air reaches a fixed limit value.

According to a first embodiment, the switchover process starts by opening the expansion valve 17, so that expansion valve 17 is opened in the flow direction of the refrigerant before heat exchanger 6, and the expansion valve 18 before heat exchanger 10 is simultaneously opened for a duration of 5 to 60 seconds. During the switchover, both heating warmth exchanger 12 and heat exchanger 10 in engine coolant circuit 3 have coolant flowing through them.

With the closing of expansion valve 18, the shutoff valve 22 to heat exchanger 10 is also closed, so that only heating warmth exchanger 12 has coolant flowing through it.

According to a second embodiment, the switchover occurs through simultaneous closing of expansion valve 18 and opening of expansion valve 17. At the start of the switchover process, in addition the shutoff valve 22 of engine cooling circuit 3 within the line to heat exchanger 10 is closed, so that in turn only the heating warmth exchanger 12 has coolant flowing through it.

The operation of the air conditioner 1 can be switched over from the heat-pump mode with air as the heat source into the heat-pump mode with coolant as the heat source, switched back or again switched on, if the comfort in the passenger compartment cannot be attained with operation in the heat-pump mode with air as the heat source.

There is no switchover into the heat-pump mode with coolant as the heat source, if the temperature of the coolant as per step 110 or step 112 is higher than or equal to 50° C., to avoid peaks in maximum pressure. Avoidance of maximum pressure peaks is especially aimed at the usage of mechanical compressors that are regulated regarding low pressure. The use of mechanical refrigerant compressors with mass flow controls as well as r.p.m.-controlled, electrically driven refrigerant is less critical as regards appearance of maximum pressure peaks, and it is easier to implement an expansion of operating range for use of coolant as the heat source.

The reverse switching of the air conditioner 1 from operation in the heat-pump mode into operation without any heating measure occurs with a prerequisite that the temperature of the coolant in engine cooling circuit 3 is sufficient for heating of the passenger compartment, i.e. for example 70° C. and higher as per step 103 as per FIG. 3, the regulation characteristic number RCN as per step 104 is smaller than or equal to 50, i.e. the target temperature for blowing out is reached, or the temperature of the passenger compartment is higher than or equal to 20° C. Since the temperature of the air flowing into the passenger compartment would be significantly reduced if the heat-pump mode of the air conditioner 1 were switched off suddenly, the transition when switching off is to be as smooth as possible.

According to a first embodiment, the power of compressor 5 is reduced in step fashion. The regulated flow of compressor 5 is reduced.

According to a second embodiment, the operation of the air conditioner 1 is switched over from a heat-pump mode with coolant as the heat source to the heat-pump mode with air as the heat source.

According to a third embodiment, when the air conditioner 1 is operated in the heat-pump mode with coolant as the heat source, the engine cooling circuit is switched over so that only coolant still flows through the heating warmth exchanger 12 and the heat exchanger 10 is cooled off or down by the refrigerant continuing to flow through. Thereby the suction pressure of the coolant in the refrigerant circuit 2, and thus, also the performance, is reduced. As soon as the suction pressure in refrigerant circuit 2, when operated in the heat-pump mode with coolant as the heat source, has approached the suction pressure to be expected when operating in the heat-pump mode with air as the heat source, i.e., the ambient temperature level, then a switchover can be made with no appreciable pressure difference from the lower pressure level of the heat-pump mode with air as a heat source to the heat-pump mode with coolant as the heat source.

In a fourth embodiment, the procedural steps of the first three embodiments are combined.

With a reverse switching of the air conditioner 1 from operation in the heat-pump mode into operation without an auxiliary heating measure, the shutoff valves 22, 23 of engine cooling circuit 3 as well as the valves 9, 13, 14, 15, 16, 17, 18 of refrigerant circuit 2 are switched after shutoff of the refrigerant circuit 2 into the position for starting the air conditioner 1 in the heat-pump mode with air as the heat source. Thus, with further switching on of the air conditioner 1 in the heat-pump mode, no switching is required in the driving cycle itself.

In the heat-pump mode with air as the heat source, the air conditioner 1 is again turned on, if the temperature of the coolant, for example, as per step 103 again drops below 70° C. or the temperature of the air in the passenger compartment as per step 105 drops below 20° C. or the regulation characteristic number RCN as per step 104 rises above a value of 50.

The air conditioner 1 in the heat-pump mode switches off "hard," i.e. suddenly, only when the maximum permissible pressure in the refrigerant circuit 2 exceeds 28 bar as per step 107.

Figure 5:
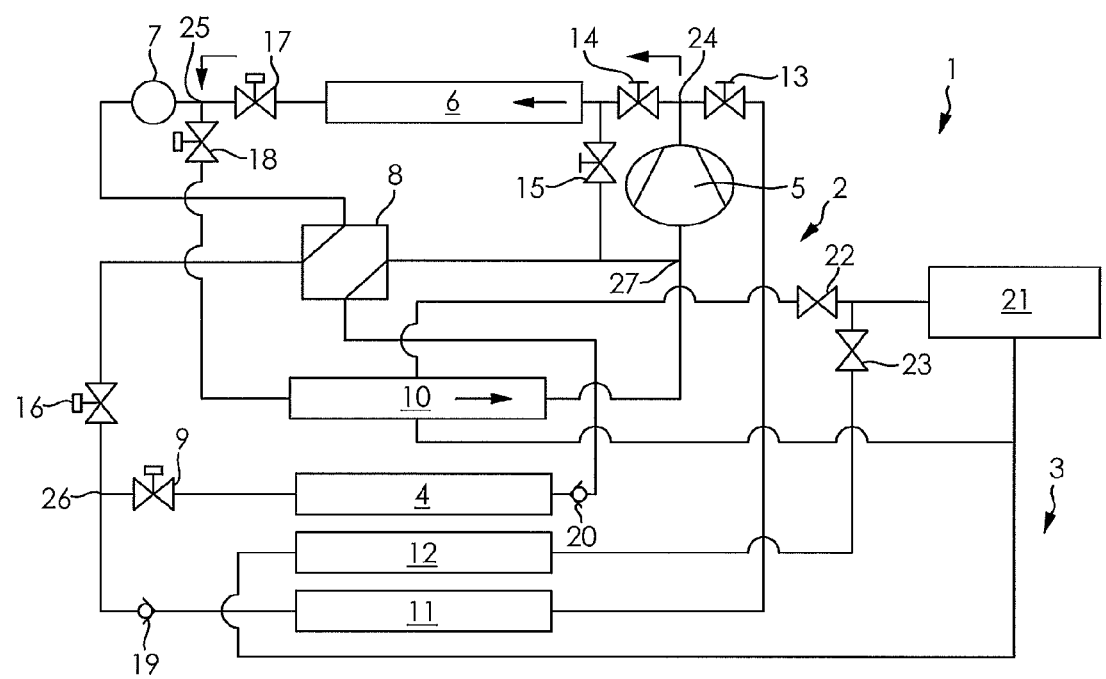
FIG. 5: the air conditioner with the refrigerant circuit in the defrosting mode.

FIG. 5 shows the air conditioner 1 with the refrigerant circuit 2 and the engine cooling circuit 3 in the defrosting mode. The heat exchanger 6 operated previously for take-up of heat as a condenser is thawed or de-iced. The refrigerant emerging from compressor 5 under high pressure and at high temperatures is fed through heat exchanger 6 with the shutoff valve 14 opened and shutoff valve 13 closed. During release of heat of the refrigerant, the heat transfer surface of heat exchanger 6 now driven as a condenser-gas cooler is de-iced.

After reduction in the tension of the refrigerant in the expansion valve 18, the refrigerant draws heat in condenser 10 from the engine cooling circuit 3 and is drawn in by suction by compressor 5. In the engine cooling circuit 3, the coolant is circulated with shutoff valve 22 opened, between the engine 21 and the condenser 10.

The refrigerant circuit 2 is switched to the thawing mode of heat exchanger 6 within the heat-pump mode with air as the heat source in dependence on the settings of expansion valves 17, 18, the r.p.m. value of the engine 21, the temperature of the refrigerant at the entry into heat exchanger 6 in the flow direction of the coolant in the heat pump mode, traffic signals, data from other vehicles, and the coolant temperature in the engine cooling circuit 3. Simultaneously, by means of coolant flowing through the heating warmth exchanger 12, a deficiency in heating power is compensated for.

According to a first embodiment, the temperatures of the coolant and of the environment, the traveling status, the comfort selected by the occupants, and the status of heat exchanger 6 determined using the pressure and temperature at the outlet of the compressor 5 as well as suction pressure are checked, to decide whether possibly the de-icing process should begin.

If an icing with a necessary start of the de-icing process is analyzed, but thawing is not possible due to the preset boundary conditions, the air conditioner 1 alternatively can be switched into the heat-pump mode with coolant as the heating source. Then the air conditioner 1 is to be run until thawing is possible. The switchover process between the heat-pump modes depends on the above-named boundary conditions.

For the thawing process, the shutoff valves 13, 14, 15 and the expansion valves 16, 17, 18 are set so that the refrigerant as per FIG. 5 is circulated in the refrigerant circuit 2.

The fan assigned to heat exchanger 6 is run at the lowest r.p.m. at the start of the process, and any louvers present are closed. After several seconds or minutes, the fan assigned to heat exchanger 6 is run up to a maximum r.p.m., to dry the heat exchanger 10. The louvers in the process are to be kept closed as much as possible, to use warmed air from the engine compartment and so that the moisture at temperatures below 0° C. does not again freeze onto the heat exchanger surface.

After the thawing mode is completed and the compressor 5 is shut off, the valves 9, 13, 14, 15, 16, 17, 18 of refrigerant circuit 2 are to be switched over to again operate the air conditioner 1 in the heat-pump mode with air as the heat source according to FIG. 1.

According to a second embodiment, the air conditioner 1 is switched over for thawing of heat exchanger 6 from the heat-pump mode with air as the heat source into the heat-pump mode with coolant as the heat source according to the method shown above.

Then the shutoff valve 14 placed between the compressor 5 and heat exchanger 6 is opened, to have warm refrigerant flow simultaneously through the heat register 11 and heat exchanger 6. The air conditioner 1 is run parallel in the heat-pump mode and the thawing mode, to reduce or avoid impairments in comfort.

A further aspect of the method for operating the air conditioner 1, especially the refrigerant circuit 2, is superheating of the refrigerant at the entrance to compressor 5. While doing so, traditional air conditioners are adjusted so that the refrigerant can enter into the compressor with a relatively high vapor content. The refrigerant is not superheated and slightly damp.

Superheating of the refrigerant after a vaporization process, like that as a condenser 4 with the air to be cooled or the heat exchanger 10 with the coolant of the engine cooling circuit 3 to be cooled, is especially necessary when:

an inner heat exchanger 8 is actively run in the refrigerant circuit 2 after the evaporation; and the settings of the refrigerant circuit 2 are primarily based on the use of expansion valves, since thereby it is necessary to detect the pressure and temperature of the refrigerant.

The number of sensors for the refrigerant cycle 2 is to be limited to reduce costs. For this reason, with the aid of a pressure-temperature sensor, superheating before and especially after the compression should be adjusted. The sensors make it possible to monitor the refrigerant at the entrance to a compressor in the refrigerant circuit without an inner heat exchanger, and the superheating with suitable actuators like expansion devices can be adjusted or with systems having inner heat exchangers through a practically determined temperature offset a superheating of the refrigerant can be ensured in the condenser, or only an almost condensed refrigerant emerges from the condenser.

The superheating after compressor 5 is adjusted for example at 5 K in the process. Through use of the pressure-temperature sensor after compressor 5, on the low-pressure side of the refrigerant circuit, various additional pressure-temperature sensors, such as in the flow direction of the refrigerant after the condenser 4, after heat exchanger 10, or after heat exchanger 6 in the heat-pump mode, can be dispensed with. In cooling unit operation, when using an inner heat exchanger, its effect must be paid attention to. A suitable offset must be chosen.

When using the air conditioner 1 in the heat-pump mode with coolant as the heat source, the superheating is regulated by means of expansion valve 18 in the flow direction before heat exchanger 10. When operating the air conditioner 1 in the heat-pump mode, with air as the heat source, the superheating is governed by means of expansion valve 17 in the flow direction before heat exchanger 6.

In a further embodiment for operating air conditioner 1 in the heat-pump mode with air as the heat source and the superheating regulated by means of expansion valve 17, the refrigerant entry temperature on heat exchanger 6 is adjusted for example to 5 K below the ambient temperature, to avoid icing of the heat exchange surfaces or formation of frost.

In an expansion of the operational range of the air conditioner 1 in the heat-pump mode with air as the heat source, the temperature and moisture of the air, as well as the comfort achieved in the passenger compartment, are detected and if necessary a switchover is made to the heat-pump mode with coolant as the heat source or other heating measures. In addition, the vaporization temperature can be raised through use of air circulated in the engine compartment in the temperature range of ambient air from −10° C. to −20° C. and lower than that. As soon as the requisite comfort has been reached in the passenger compartment, a switchover can be made to the air conditioner 1 to the heat-pump mode with air as the heat source. Due to the low air humidity and the low water content in the air at these temperatures, a possible icing of the heat exchange surfaces presents no problem. The heat pump mode with air as the heating source is shut off when the suction pressure of the refrigerant in the refrigerant circuit 2 reaches pressures below the ambient pressure of about 1 bar. Exceptions to this are brief periods when the ambient pressure is fallen short of, for example, when starting the air conditioner 1 in the heat-pump mode up to about 0.5 bar. When it falls short of the ambient pressure for longer periods, i.e. periods of up to 5 minutes, the heat-pump mode is shut off.

Air directed in the motor vehicle or in the passenger compartment relative to the air outlets directed to the windshield, the occupants or the foot well during the heating-up process is governed in dependence on the values of the rain and/or moisture and/or mist sensor of the windshield. If the windshield is free or not misted up, then no air is directed to the windshield, since this could result in excessively great heat losses, only a small share of air is directed to the windshield, while simultaneously an additional air flow is directed to the foot well, to the occupants or into the rear part of the passenger compartment.

Additionally, the windshield is designed to be thermally insulated by means of a composite glass or a combination of glass and plastic. Alternatively, a heated windshield can be used.

The air conditioner 1 is regulated for heating and cooling so that refrigerant superheated by compressor 5 or refrigerant with a small share of liquid is brought in by suction. The determining amount for the refrigerant in the liquid share is the superheating after the compression, which should be at least 5 K to 7 K. For this, in the particular operating mode, the expansion valves 16, 17, 18 can be regulated.

From the foregoing description, one ordinarily skilled in the art can easily ascertain the essential characteristics of this invention and, without departing from the spirit and scope thereof, can make various changes and modifications to the invention to adapt it to various usages and conditions.

LIST OF REFERENCE SYMBOLS

1 Air conditioner
2 Refrigerant circuit
3 Engine cooling circuit, coolant circuit
4 Condenser, heat exchanger
5 Compressor
6 Heat exchanger, ambient air-refrigerant heat exchanger
7 Plenum
8 Inner heat exchanger
9 Valve
10 Heat exchanger, condenser, coolant-refrigerant heat exchanger
11 Heat exchanger, heat register
12 Heat exchanger, heating warmth exchanger
13 Valve, shutoff valve refrigerant circuit
14 Valve, shutoff valve refrigerant circuit
15 Valve, shutoff valve refrigerant circuit
16 Valve, expansion valve refrigerant circuit
17 Valve, expansion valve refrigerant circuit
18 Valve, expansion valve refrigerant circuit
19 Check valve refrigerant circuit
20 Check valve refrigerant circuit
21 Engine
22 Valve, shutoff valve, engine cooling circuit
23 Valve, shutoff valve, engine cooling circuit
24 Branch
25 Branch
26 Branch
27 Emptying site
100-116 Steps of a method
T_Um Ambient temperature
WP heat-pump mode
RCN Regulation characteristic number
HD High pressure
InnenTemp Temperature of the air in the passenger compartment

What is claimed is:

1. A method of operating an air conditioner for treating air of a passenger compartment of a motor vehicle, the method comprising the steps of:
providing the air conditioner, wherein the air conditioner includes a refrigerant circuit configured for a combined cooling unit mode and heat-pump mode and for a post-heating mode, and wherein the air conditioner has a first heat source and a second heat source when in the heat-pump mode;
determining a temperature of the first heat source;
determining a temperature of the second heat source;
determining a regulation characteristic number, wherein the regulation characteristic number is determined from a deviation of a target status of the air to be fed into the passenger compartment from a de facto status of the air to be fed into the passenger compartment;
determining a maximum pressure within the refrigerant circuit; and
changing a mode of operation of the air conditioner based on the determination of at least one of the temperature of the first heat source, the temperature of the second heat source, the regulation characteristic number, and the maximum pressure within the refrigerant circuit,
wherein the air conditioner operating in the heat-pump mode is configured to be operable in at least one of a first heat-pump mode and a second heat-pump mode, wherein in the first heat-pump mode at least the first heat source is used and in the second heat-pump mode at least the second heat source is used, wherein a method for changing between the first heat-pump mode and the second heat-pump mode comprises the steps of:
operating the air conditioner in the first heat-pump mode;
comparing the temperature of the first heat source with a first limit value;
wherein:
1) if the temperature of the first heat source reaches or exceeds the first limit value, a determination is made whether a maximum heating performance setting on an operating device of the air condition is activated, wherein:
i) if the maximum heating performance setting is not activated, operation in the first heat-pump mode is maintained;
ii) if the maximum heating performance setting is activated, the temperature of the second heat source is compared with a second limit value, wherein:

a) upon the temperature of the second heat source reaching or exceeding the second limit value, operation in the first heat-pump mode is maintained;
b) if the temperature of the second heat source falls short of the second limit value, operation is changed to the second heat-pump mode;
2) if the temperature of the first heat source falls short of the first limit value, the temperature of the second heat source is compared with a sixth limit value, wherein:
i) if the temperature of the second heat source reaches or falls short of the sixth limit value, operation in the first heat-pump mode is maintained;
ii) if the temperature of the second heat source exceeds the sixth limit value, the temperature of the second heat source is compared with the second limit value, wherein:
a) if the temperature of the second heat source reaches or exceeds the second limit value, operation is maintained in the first heat-pump mode;
b) if the second limit value is fallen short of, the operation changes to the second heat-pump mode.

2. The method according to claim 1, further comprising the steps of:
operating the air conditioner in the heat-pump mode;
comparing the temperature of the first heat source with a first limit value, wherein upon the temperature of the first heat source reaching or exceeding the first limit value the refrigerant circuit is not operated in the heat-pump mode;
comparing the temperature of the second heat source with a second limit value, wherein upon the temperature of the second heat source reaching or exceeding the second limit value the refrigerant circuit is not operated in the heat-pump mode;
comparing the regulation characteristic number with a third limit value, wherein upon the regulation characteristic number reaching or falling short of the third limit value the refrigerant circuit is not operated in the heat-pump mode; and
comparing the maximum pressure in the refrigerant circuit with a fifth limit value, wherein upon the maximum pressure reaching or exceeding the fifth limit value the refrigerant circuit is not operated in the heat-pump mode.

3. The method according to claim 2, further comprising the step of determining and comparing a temperature of the air in the passenger compartment with a fourth limit value, wherein upon the temperature of the air in the passenger compartment reaching or exceeding the fourth limit value the refrigerant circuit is not operated in the heat-pump mode.

4. The method according to claim 2, wherein:
the first limit value of the first heat source is in the range of about 0° C. to 20° C.;
the second limit value of the second heat source is in the range of about 30° C. to 100° C.;
the third limit value of the regulation characteristic number exhibits a value at which a desired temperature of the air is reached in the passenger compartment and it is not necessary to operate the air conditioner in a heat-pump mode to obtain the desired temperature of the air in the passenger compartment; and
the fifth limit value of maximum pressure in the refrigerant circuit is in the range of about 18 bar to 32 bar.

5. The method according to claim 1, wherein:
the first limit value of the first heat source is in the range of about −10° C. to +5° C.;
the second limit value of the second heat source is in the range of about 40° C. to 70° C.; and
the sixth limit value of the second heat source is in the range of about 0° C. to 20° C.

6. The method according to claim 1, wherein the operation of the air conditioner is changed to the second heat-pump mode, the method further comprising the steps of:
comparing the regulation characteristic number with a third limit value, wherein:
1) if the regulation characteristic number exceeds the third limit value, the operation is maintained in the second heat-pump mode;
2) if the regulation characteristic number reaches or falls short of the third limit value, the operation is changed into the first heat-pump mode; and
comparing the maximum pressure in the refrigerant circuit with a fifth limit value, wherein:
1) if the maximum pressure in the refrigerant circuit reaches or falls short of the fifth limit value, the operation is maintained in the second heat-pump mode;
2) if the maximum pressure in the refrigerant circuit exceeds the fifth limit value, operation is changed to the first heat-pump mode.

7. The method according to claim 6, wherein:
the third limit value of the regulation characteristic number is a value which identifies a temperature below the desired temperature in the passenger compartment; and
the fifth limit value of the maximum pressure in the refrigerant circuit lies in a range between about 2 bar and 16 bar.

* * * * *